US011366874B2

(12) United States Patent
Newns et al.

(10) Patent No.: US 11,366,874 B2
(45) Date of Patent: Jun. 21, 2022

(54) ANALOG CIRCUIT FOR SOFTMAX FUNCTION

(71) Applicant: INTERNATIONAL BUSINESS MACHINES CORPORATION, Armonk, NY (US)

(72) Inventors: Dennis Newns, Yorktown Heights, NY (US); Paul Solomon, Westchester, NY (US); Xiaodong Cui, Chappaqua, NY (US); Jin Ping Han, Yorktown Heights, NY (US); Xin Zhang, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 881 days.

(21) Appl. No.: 16/198,945

(22) Filed: Nov. 23, 2018

(65) Prior Publication Data

US 2020/0167402 A1    May 28, 2020

(51) Int. Cl.
| | | |
|---|---|---|
| G06F 17/10 | (2006.01) |
| G06F 9/30 | (2018.01) |
| G06N 3/08 | (2006.01) |
| G06F 9/38 | (2018.01) |
| G06K 9/62 | (2022.01) |
| G06N 3/063 | (2006.01) |

(52) U.S. Cl.
CPC ............ *G06F 17/10* (2013.01); *G06F 9/3001* (2013.01); *G06F 9/30029* (2013.01); *G06F 9/38* (2013.01); *G06K 9/6276* (2013.01); *G06N 3/0635* (2013.01); *G06N 3/088* (2013.01)

(58) Field of Classification Search
None
See application file for complete search history.

(56) References Cited

U.S. PATENT DOCUMENTS

| | | | |
|---|---|---|---|
| 7,016,884 B2 | 3/2006 | Platt | |
| 8,065,246 B2 | 11/2011 | Bouchard | |
| 2016/0117587 A1 | 4/2016 | Zhicheng | |
| 2017/0103321 A1* | 4/2017 | Henry | ............... G06N 3/088 |
| 2018/0053088 A1 | 2/2018 | Supriyo | |

(Continued)

FOREIGN PATENT DOCUMENTS

WO     2014164080 A1    1/2014

OTHER PUBLICATIONS

"Generalized Softmax Networks for Non-linear Component Extraction" Jorg Lucke and Maneesh Sahani Gatsby Computational Neuroscience Unit, UCL, London WC1N 3AR, UK 2007 (11 Pages).

(Continued)

*Primary Examiner* — Steven M Christopher
(74) *Attorney, Agent, or Firm* — Griffiths & Seaton PLLC

(57) ABSTRACT

Embodiments for implementing a softmax function in an analog circuit. The analog circuit may comprise a plurality of input nodes to accept voltage inputs; a plurality of diodes connected to each of the plurality of input nodes to perform a current adding function; a log amplifier coupled to the plurality of diodes; a plurality of analog adders coupled to the voltage inputs and an output of the log amplifier; and a plurality of exponential amplifiers, each of the plurality of exponential amplifiers coupled to one of the plurality of analog adders.

20 Claims, 5 Drawing Sheets

(56) References Cited

U.S. PATENT DOCUMENTS

2021/0294874 A1* 9/2021 Tang .................... G06N 3/0454

OTHER PUBLICATIONS

"Analog Current-Mode Design for Soft-Max Computation" Davide Piombo and Rodolfo Zunino Department of Biophysical and Electronic Engineering, University of Genoa via Opera Pia I la, 16145 Genova, Italy—E-mail: {piombo, zunino} (dibe.unige.it) Jul. 31, 2005 ( 6 Pages).

* cited by examiner

LOG AMPLIFIER

ADDER

EXP AMPLIFIER

US 11,366,874 B2

ANALOG CIRCUIT FOR SOFTMAX FUNCTION

BACKGROUND OF THE INVENTION

Field of the Invention

The present invention relates in general analog circuits and, particularly, to circuits and methods of manufacturing circuits which output a softmax function.

Description of the Related Art

Deep learning has led to state-of-the-art improvements in the accuracy of many artificial intelligence tasks, such as large-category image classification and recognition, speech recognition and nature language processing. The architecture can involve complex and many-layered neural networks (e.g., deep neural networks (DNN)) that can require intense computation for training and/or evaluation. Targeting to different types of training and inference tasks, the structure of DNN varies with flexible choices of different component layers, such as fully connection layer, convolutional layer, pooling layer and softmax layer. Deviated from other layers that only require simple operations like addition or multiplication, the softmax layer contains expensive exponentiation and division which uses a vector of input numbers into an output of probabilities that sum to one.

SUMMARY OF THE INVENTION

Various embodiments for implementing a softmax function in an analog circuit. In one embodiment, the analog circuit may comprise a plurality of input nodes to accept voltage inputs; a plurality of diodes connected to each of the plurality of input nodes to perform a current adding function; a log amplifier coupled to the plurality of diodes; a plurality of analog adders coupled to the voltage inputs and an output of the log amplifier; and a plurality of exponential amplifiers, each of the plurality of exponential amplifiers coupled to one of the plurality of analog adders.

The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
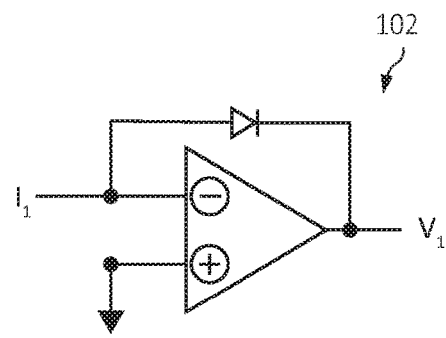
FIG. 1 is a schematic diagram of functional building blocks for an analog circuit implementing a softmax function.
Figure 1:
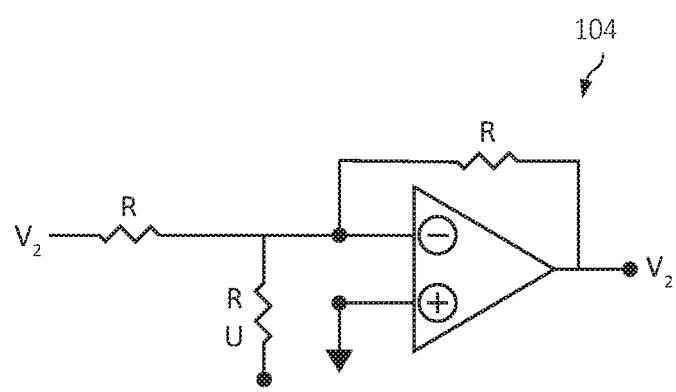
Figure 1:
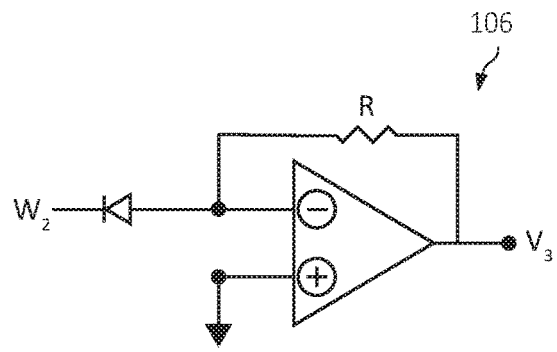

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

In the following detailed description, for purposes of explanation, numerous specific details are set forth in order to provide a thorough understanding of the subject matter of the present application. It will be evident, however, to one skilled in the art that the disclosed embodiments, the claimed subject matter, and their equivalents may be practiced without these specific details.

The detailed description includes references to the accompanying drawings, which form a part of the detailed description. The drawings show illustrations in accordance with example embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

The time taken and energy expended in supervised training of DNN is a legitimate concern. For instance, photographs require many thousands of examples to be provided to train the DNN to recognize a particular object. This can become extremely time intensive, especially as the complexity of the object or pattern increases. As a solution, hardware implementation of the NN synapses (i.e., memories) as a form of analog memory leads to a non-volatile memory (NVM) hardware NN matrix which in principle can be operated in O(1) time, as read and write of the nm elements is simultaneous, leading to fast and energy-efficient training. In other words, compared to standard NVM which inherently accesses one column/row of memory at a time, analog synapse memory is able to access and write to the memory in one step, which increases performance significantly.

However input/output (I/O) for the n input channels and m output channels of the memory, both analog, is then an issue. While I/O via a digital computer is one solution, it involves multiple analog-to-digital converters (ADCs) and digital-to-analog converters (DACs). An alternative is to use analog technology to process the analog signals wherever possible. In the case of a probabilistic DNN output (e.g., as in pattern recognition) it is necessary to implement the softmax function at the DNN output. Hence it is desirable to invent an analog circuit solution for providing the softmax function at the DNN output, as one of several circuit functionalities needed in the global hardware DNN implementation.

Accordingly, the various embodiments described herein include analog circuits implementing a softmax function. The basic building block of the illustrated softmax circuit implementation is the operational amplifier (opamp), which can be implemented with on the order of 5-20 transistors (e.g., metal oxide semiconductor field-effect transistors (MOSFETs), etc.), thereby taking up acceptable amount of space in current integrated circuit (IC) technologies. It is a known art that the opamp with diode can be used to implement the functions of a logarithmic (log) amplifier, opamp adder (i.e., summing amplifier), and exponential amplifier. The mechanisms of the present invention therefore illustrate a novel circuit from these building blocks capable of implementing the softmax function (normalized exponential function).

One analog circuit comprises a plurality of input nodes (i.e., terminals) to accept voltage inputs. Connected to each of the plurality of input nodes are a plurality of diodes to perform a current adding function, and a log amplifier is coupled to the plurality of diodes. A plurality of analog adders are coupled to the voltage inputs and an output of the log amplifier; and each of a plurality of exponential amplifiers are coupled to one of the plurality of analog adders.

Turning now to the figures, FIG. 1 is a block diagram of one embodiment of functional building blocks 100 for forming the analog circuit implementing the softmax function. Illustrated are a log amplifier 102, adder 104, and exponential amplifier 106, each associated with respective functionalities of the opamp. The opamps are conventionally assumed to have a very high voltage gain in the differential channel, a large negative (dB) gain in the common channel, and a high input impedance. The log amplifier 102 and exponential amplifier 106 involve a diode component which is defined in terms of its threshold voltage $V_T$ and its saturation current $I_S$, and $I_D$ is the current through the diode.

The considered log amplifier 102 is intended to comprise an ordinary logarithmic amplifier providing an output voltage which is proportionate to the logarithm of applied input voltage, where $$I_D = I_S e^{V_D/V_T}$$

$$V_1 = -V_T \ln(I_1/I_S).$$

The considered adder 104 is intended to comprise a summing amplifier producing an inverted output voltage which is proportional to the sum of the input voltages V1 and U, where $$V_2 = -(U + v_2).$$

The considered exponential amplifier 106 is intended to comprise an anti-logarithmic amplifier whose output is proportional to the exponential value of the input, where $$V_3 = RI_S e^{-W_3/V_T}.$$

It should be noted that the disclosed functions (and expressions contained therein), unless explicitly stated, are intended to be shown commensurate with their known descriptions in the art and those shown in the Figures, as one of ordinary skill in the art would appreciate.

Figure 2:
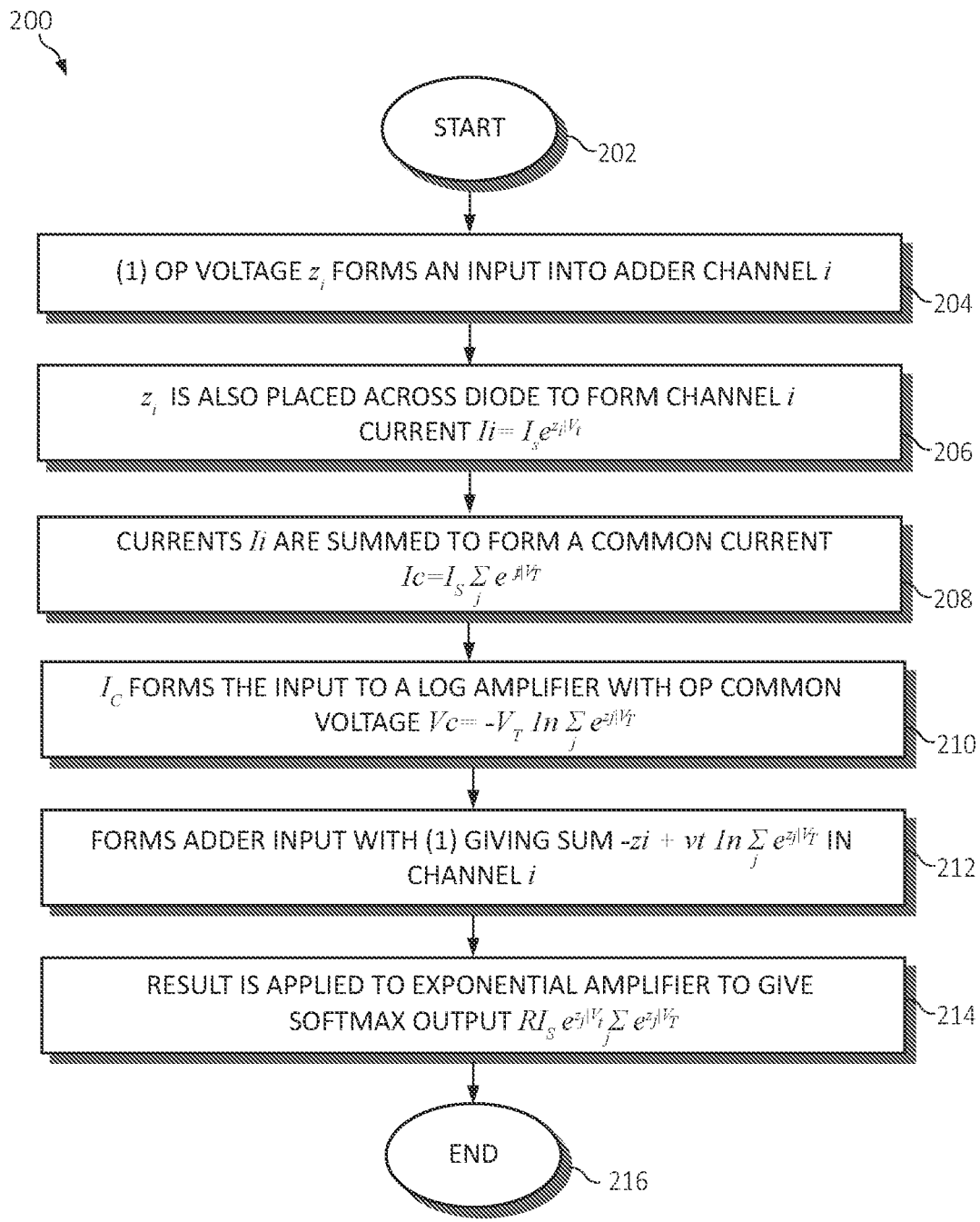
FIG. 2 is a method for forming the analog circuit implementing the softmax function using the functional building blocks, in which aspects of the present invention may be realized.

Turning now to FIG. 2, a method 200 for forming the analog circuit implementing the softmax function using the functional building blocks described in FIG. 1 is illustrated. That is, the method 200 illustrates using the building blocks for log amplifier 102, adder 104, and exponential amplifier 106 functionalities are combined to form the softmax functionality for the example of three DNN outputs $z_i$.

The method 200 begins (step 202) by receiving an input (OP) voltage $Z_i$ forming an input into the adder 104 in channel i (step 204). $Z_i$ is also placed across a plurality of diodes connected to each of the input nodes of the adder 104 to form channel i current $I_i = I_S e^{z_i/V_T}$ (step 206). The currents are summed to form a common current $I_C = I_S \Sigma_j e^{V_j/V_T}$ (step 208). $I_C$ then forms the input to the log amplifier 102 with the OP common voltage $V_C = -V_T \ln \Sigma_j e^{V_j/V_T}$ (step 210). $V_C$ then forms the adder input to the adder 104 (as in step 202) giving a sum of $-Z_i + V_T \ln \Sigma_j e^{V_j/V_T}$ in channel i (step 212). The result of step 212 (i.e., the sum) is applied to the exponential amplifier 106 to give the softmax output $RI_S e^{z_i/V_T}/\Sigma_j e^{V_j/V_T}$ (step 214). The method 200 ends (step 216).

Figure 3:
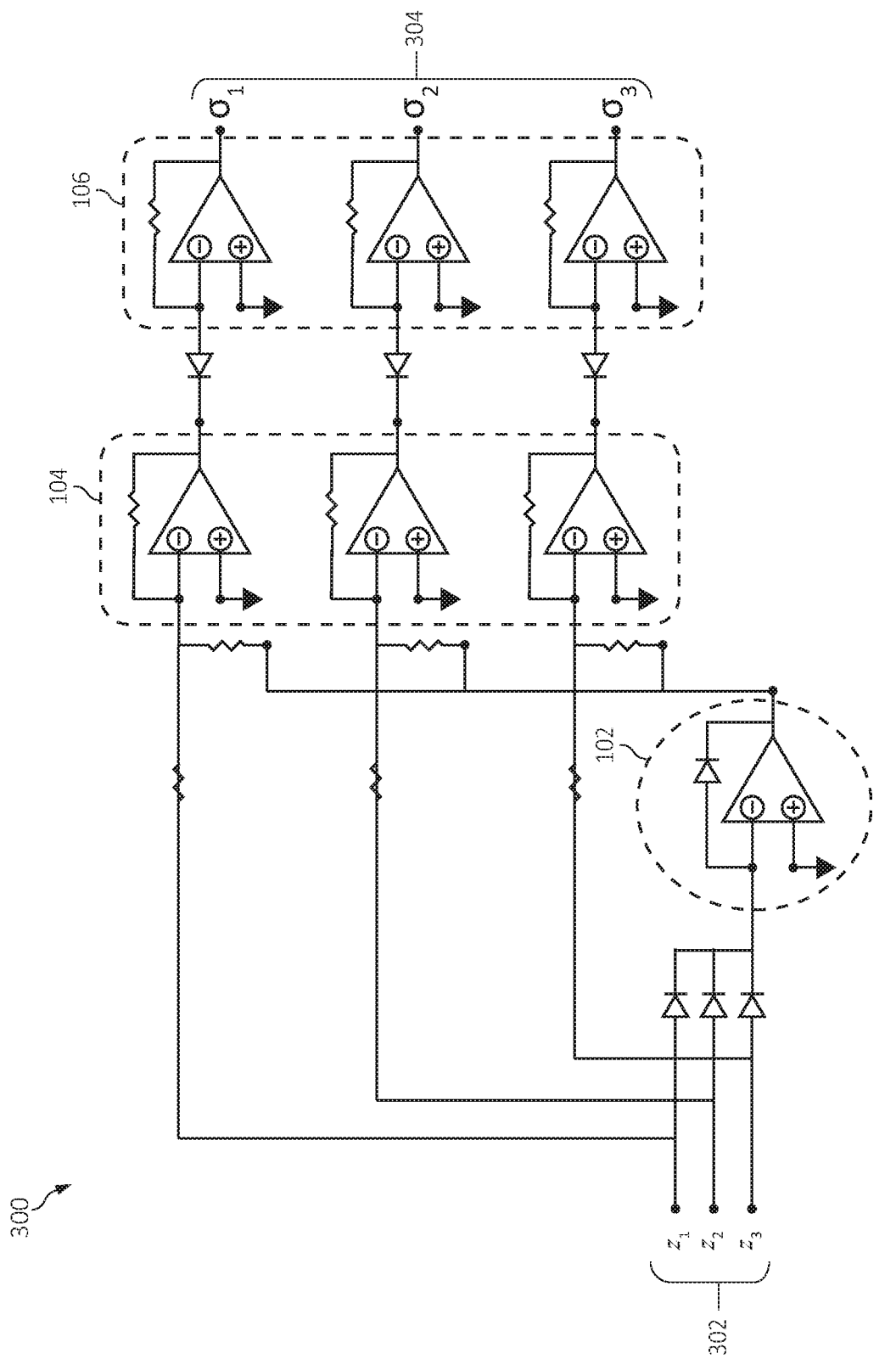
FIG. 3 is a schematic diagram for the analog circuit implementing the softmax function.

FIG. 3 is a schematic diagram for the analog circuit 300 implementing the softmax function as described in the method 200. It should be noted that, while the components of the analog circuit are described as being singular, the circuit may comprise a plurality of each of the components, as depicted in FIG. 3. For instance, FIG. 3 depicts the analog circuit as having three inputs (to three sets of the log amplifier 102, adder 104, and exponential amplifier 106), however any number of these components may be used, as one of ordinary skill in the art would appreciate.

The analog circuit 300 includes input (OP) voltage $Z_i$ 302 forming the input into the adder 104 in channel i, by a current to voltage converter coupled to a given one of the input nodes. Further coupled to the input node may be a digital to analog converter, where an output of the digital to analog converter is coupled to a given one of the input nodes. $Z_i$ is also placed across a plurality of diodes connected to each of the input nodes of the adder 104 to form channel i current $I_i = I_S e^{z_i/V_T}$. The currents are summed to form a common current $I_C = I_S \Sigma_j e^{V_j/V_T}$. $I_C$ then forms the input to the log amplifier 102 with the OP common voltage $V_C = -V_T \ln \Sigma_j e^{V_j/V_T}$, and $V_C$ then forms the adder input to the adder 104 giving a sum of $-Z_i + V_T \ln \Sigma_j e^{V_j/V_T}$ in channel i. The result of step is applied to the exponential amplifier 106 to give the softmax output $RI_S e^{z_i/V_T}/\Sigma_j e^{V_j/V_T}$ 304. An output of the exponential amplifier may further be connected to an analog to digital converter forming a digital output such that an input of the analog to digital converter is coupled to an output of the exponential amplifier 106. When combined, the softmax output may then be expressed as $$\sigma_i = \frac{RI_S e^{z_i/V_T}}{\sum_j e^{z_j/V_T}}.$$

Bias Circuit

The diode formula is only applicable as long as the voltage across the diode does not change sign, typically remaining in the positive (forward) sense. In order to ensure this condition, a positive bias current $I_0$ is applied to each of the input nodes (terminals), respectively, by a plurality of bias current generators to provide a the positive bias current $I_0$, which is larger than any anticipated reverse current.

Figure 4:
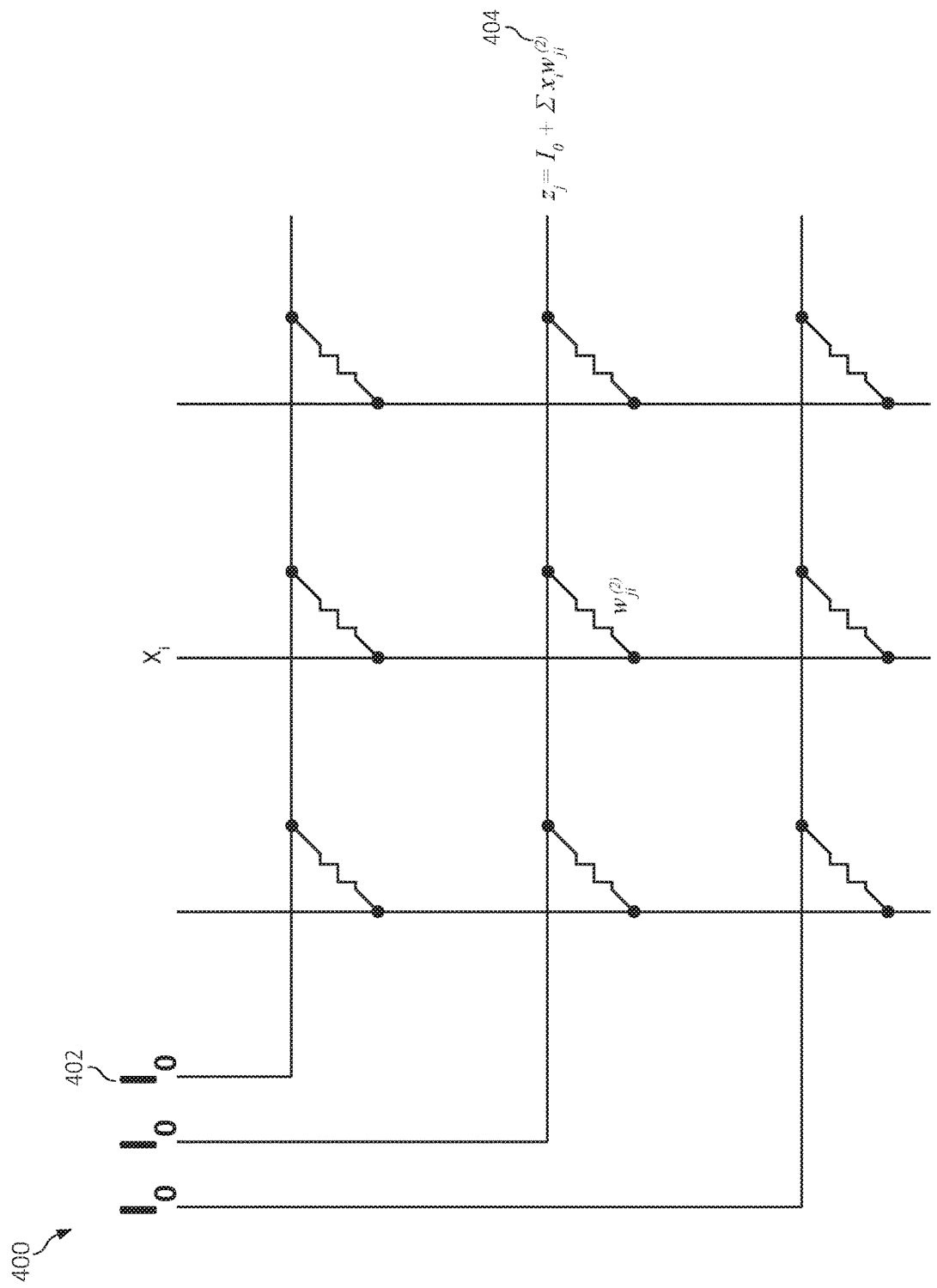
FIG. 4 is a schematic diagram of a bias circuit providing a constant bias current to the analog circuit implementing the softmax function.

FIG. 4 is a schematic diagram of a bias circuit 400 providing a constant bias current to the analog circuit 300 implementing the softmax function, illustrating how the bias currents $I_0$ are added into the output lines of the synapse matrix so as to maintain the positivity of $z_j$, where $$z_j = I_0 + \sum_i x_i w_{ji}^{(2)}.$$

The effect of the bias current on the softmax output is zero as it cancels between the numerator and denominator of $\sigma_i$. Therefore, as depicted in bias circuit 400, by adding an appropriate fixed current $I_0$ 402 to each $z_i$, 404, occurrence of zero diode current can be avoided without changing the softmax output of the circuit 300. Accordingly, the bias current is introduced with the current drawing on a particular column, for example, (j), and the output matrices are fed into the analog to digital converter (one per column) and read according to the synapse.

Figure 5:
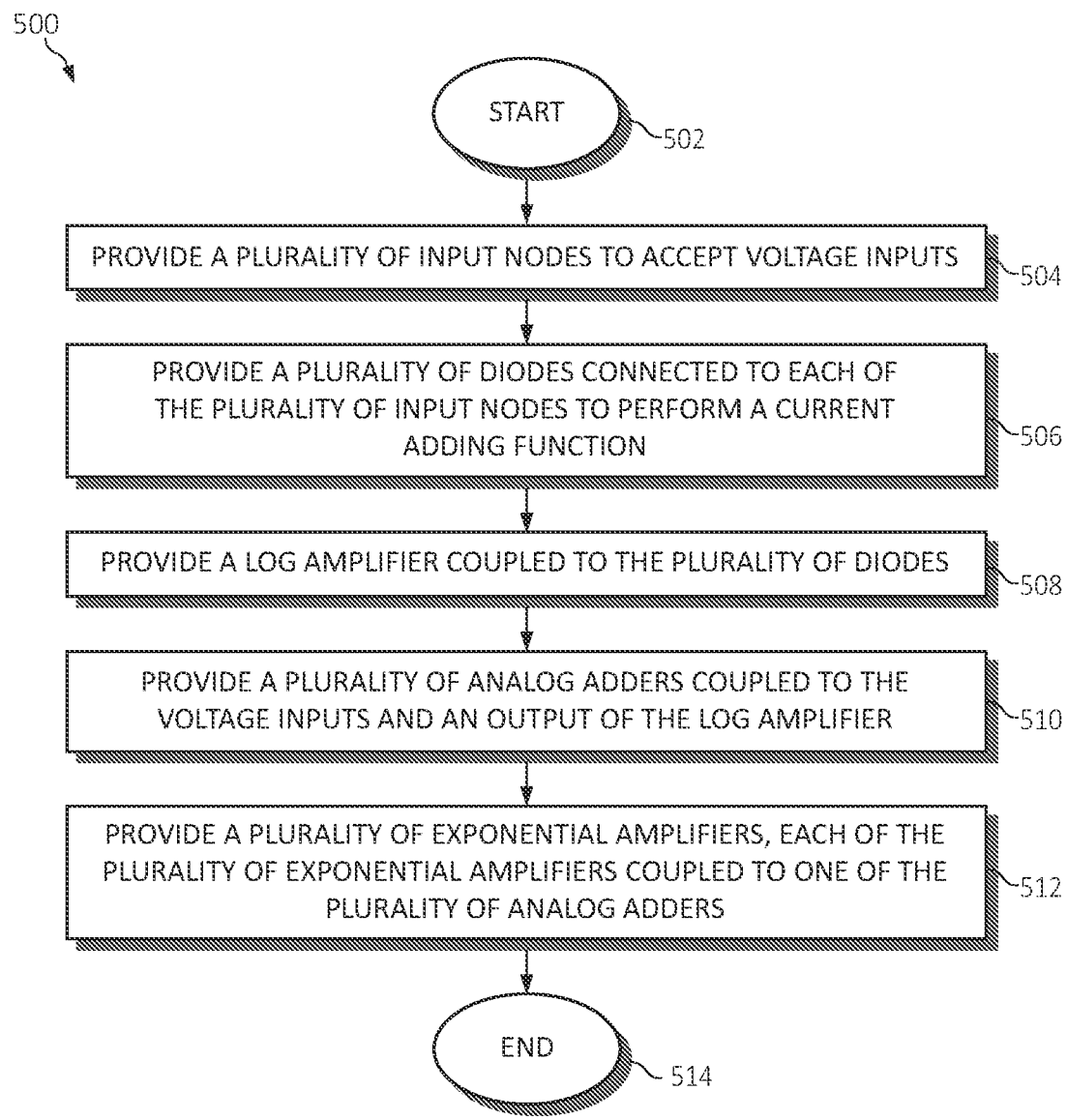
FIG. 5 is a flow chart diagram illustrating a method for manufacturing the analog circuit implementing the softmax function, in accordance with aspects of the present invention.

Concluding, FIG. 5 is a flow chart diagram illustrating a method 500 for manufacturing the analog circuit 300 implementing a normalized exponential function (i.e., the softmax function), in accordance with aspects of the present invention. The method 500 begins by providing a plurality of input nodes to accept voltage inputs (step 504). A plurality of diodes may be provided which are connected to each of the plurality of input nodes to perform a current adding function (step 506). A log amplifier is provided which is coupled to the plurality of diodes (step 508). A plurality of analog adders are provided, each of which are coupled to the voltage inputs and an output of the log amplifier (step 510). Finally, a plurality of exponential amplifiers may be provided, where each of the plurality of exponential amplifiers are coupled to one of the plurality of analog adders (step 512). The method 500 ends (step 514).

In conjunction with the method 500 (and the analog circuit 300), a plurality of bias current generators may be provided; where each bias current generator provides a fixed current to one of the input nodes.

In conjunction with the method 500 (and the analog circuit 300), the fixed current may comprise a positive bias current larger than any anticipated reverse current.

In conjunction with the method 500 (and the analog circuit 300), a plurality of current to voltage converters may be provided; where an output of each current to voltage converter is coupled to one of the input nodes.

In conjunction with the method 500 (and the analog circuit 300), a plurality of digital to analog converters may be provided; where an output of each digital to analog converter is coupled to one of the input nodes.

In conjunction with the method 500 (and the analog circuit 300), a plurality of digital to analog converters may be provided; where an input of each analog to digital converter is connected to an output of one of the log exponential amplifiers.

The present invention may be an apparatus, system, a method, and/or a computer program product. That is, portions of the described invention (or functionality related thereto) may be implemented within the context of an apparatus, such as an IC, or within the context of a computer application. The computer program product may include a computer readable storage medium (or media) having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of apparatus', systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. An analog circuit, comprising:
   a plurality of input nodes to accept voltage inputs;
   a plurality of diodes connected to each of the plurality of input nodes to perform a current adding function;
   a log amplifier coupled to the plurality of diodes;
   a plurality of analog adders coupled to the voltage inputs and an output of the log amplifier; and
   a plurality of exponential amplifiers, each of the plurality of exponential amplifiers coupled to one of the plurality of analog adders.

2. The analog circuit of claim 1, further comprising a plurality of bias current generators; wherein each bias current generator provides a fixed current to one of the input nodes.

3. The analog circuit of claim 2, wherein the fixed current comprises a positive bias current larger than any anticipated reverse current.

4. The analog circuit of claim 1, further comprising a plurality of current to voltage converters; wherein an output of each current to voltage converter is coupled to one of the input nodes.

5. The analog circuit of claim 1, further comprising a plurality of digital to analog converters; wherein an output of each digital to analog converter is coupled to one of the input nodes.

6. The analog circuit of claim 1, further comprising a plurality of analog to digital converters; wherein an input of each analog to digital converter is connected to an output of one of the exponential amplifiers.

7. The analog circuit of claim 1, wherein the analog circuit implements a normalized exponential function such that the plurality of exponential amplifiers output a softmax function.

8. A analog circuit, comprising:
   a plurality of input nodes, each of the input nodes accepting a voltage input z;
   a plurality of diodes connected to each of the plurality of input nodes to perform a current adding function; wherein the voltage z is placed across respective diodes of the plurality of diodes to form a channel i current, and wherein the channel i current of each of the plurality of diodes is summed to form a common current;
   a log amplifier coupled to the plurality of diodes; wherein the common current forms an input to the log amplifier;
   a plurality of analog adders coupled to the voltage inputs and an output of the log amplifier; and
   a plurality of exponential amplifiers, each of the plurality of exponential amplifiers coupled to one of the plurality of analog adders; wherein each of the exponential amplifiers output a softmax function.

9. The analog circuit of claim 8, further comprising a plurality of bias current generators; wherein each bias current generator provides a fixed current to one of the input nodes.

10. The analog circuit of claim 9, wherein the fixed current comprises a positive bias current larger than any anticipated reverse current.

11. The analog circuit of claim 8, further comprising a plurality of current to voltage converters; wherein an output of each current to voltage converter is coupled to one of the input nodes.

12. The analog circuit of claim 8, further comprising a plurality of digital to analog converters; wherein an output of each digital to analog converter is coupled to one of the input nodes.

13. The analog circuit of claim 8, further comprising a plurality of analog to digital converters; wherein an input of each analog to digital converter is connected to an output of one of the exponential amplifiers.

14. A method of manufacturing an analog circuit, comprising:
   providing a plurality of input nodes to accept voltage inputs;
   providing a plurality of diodes connected to each of the plurality of input nodes to perform a current adding function;
   providing a log amplifier coupled to the plurality of diodes;
   providing a plurality of analog adders coupled to the voltage inputs and an output of the log amplifier; and
   providing a plurality of exponential amplifiers, each of the plurality of exponential amplifiers coupled to one of the plurality of analog adders.

15. The method of claim 14, further comprising providing a plurality of bias current generators; wherein each bias current generator provides a fixed current to one of the input nodes.

16. The method of claim 15, wherein the fixed current comprises a positive bias current larger than any anticipated reverse current.

17. The method of claim 14, further comprising a plurality of current to voltage converters; wherein an output of each current to voltage converter is coupled to one of the input nodes.

18. The method of claim 14, further comprising a plurality of digital to analog converters; wherein an output of each digital to analog converter is coupled to one of the input nodes.

19. The method of claim 14, further comprising a plurality of analog to digital converters; wherein an input of each analog to digital converter is connected to an output of one of the exponential amplifiers.

20. The method of claim 14, wherein the analog circuit implements a normalized exponential function such that the plurality of exponential amplifiers output a softmax function.

* * * * *